United States Patent

(12) United States Patent
Peretz

(10) Patent No.: US 12,537,434 B2
(45) Date of Patent: Jan. 27, 2026

(54) DIGITAL ZERO-CURRENT SWITCHING LOCK-IN CONTROLLER IC FOR OPTIMIZED OPERATION OF RESONANT SWITCHED-CAPACITOR CONVERTERS (SCCS)

(71) Applicant: B.G. NEGEV TECHNOLOGIES AND APPLICATIONS LTD., AT BEN-GURION UNIVERSITY, Beer Sheva (IL)

(72) Inventor: Mor Mordechai Peretz, Lehavim (IL)

(73) Assignee: B.G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 75 days.

(21) Appl. No.: 17/632,606

(22) PCT Filed: Aug. 4, 2020

(86) PCT No.: PCT/IL2020/050854
§ 371 (c)(1),
(2) Date: Feb. 3, 2022

(87) PCT Pub. No.: WO2021/024255
PCT Pub. Date: Feb. 11, 2021

(65) Prior Publication Data
US 2022/0278603 A1    Sep. 1, 2022

Related U.S. Application Data

(60) Provisional application No. 62/882,530, filed on Aug. 4, 2019.

(51) Int. Cl.
*H02M 3/07* (2006.01)
*H02M 1/00* (2006.01)
(Continued)

(52) U.S. Cl.
CPC ........... *H02M 1/0058* (2021.05); *H02M 3/01* (2021.05); *H02M 3/07* (2013.01); *H02M 1/0012* (2021.05); *H02M 1/0095* (2021.05); *H02M 1/36* (2013.01)

(58) Field of Classification Search
CPC ............ H02M 1/0012; H02M 1/0058; H02M 1/0095; H02M 1/38; H02M 3/01; H02M 3/015; H02M 3/07–077; H02M 3/157
See application file for complete search history.

(56) References Cited

U.S. PATENT DOCUMENTS

| 5,416,481 | A | * | 5/1995 | Chen | ..................... H03M 3/328 341/131 |
| 9,780,663 | B2 | * | 10/2017 | Lidsky | ..................... G05F 1/10 |

(Continued)

FOREIGN PATENT DOCUMENTS

| CN | 1910939 A | 2/2007 |
| CN | 109361314 A | 2/2019 |

(Continued)

OTHER PUBLICATIONS

PCT International Search Report and Written Opinion for corresponding Application No. PCT/IL2020/050854, mailed on Jan. 4, 2021, 7 pages.

(Continued)

*Primary Examiner* — Fred E Finch, III
(74) *Attorney, Agent, or Firm* — Dority & Manning, P.A.

(57) ABSTRACT

A digital lock-in controller for Resonant-type converters with one or more sub-circuits having resonant tanks and one or more flying capacitors connected across the resonant tanks, which comprises an auto-tuner that receives as input Zero-Current Detect (ZCD) signals and implements a tuning algorithm by performing arithmetic operations that ensure Zero-Current Switching (ZCS) operation for all resonant tanks in the converter; a digital hybrid High-Resolution (Continued)

(HR) sequencer that receives as input the switching times commands and generates a pulse-width-modulated signal that is fed into the gates of the converter's switching transistors; a sampling block with time resolution of a single delay-element, for accurately reading of the ZCD sensor's outputs; a governor module for performing all synchronization actions and dictating the operation mode of the controller, based on auxiliary configurations.

13 Claims, 13 Drawing Sheets

(51) Int. Cl.
  *H02M 1/36* (2007.01)
  *H02M 3/00* (2006.01)

(56) References Cited

U.S. PATENT DOCUMENTS

| | | |
|---|---|---|
| 2003/0081667 A1 | 5/2003 | Camnitz et al. |
| 2006/0055574 A1* | 3/2006 | Maksimovic ......... G04F 10/005 341/155 |
| 2008/0204160 A1 | 8/2008 | Prodic et al. |
| 2008/0310200 A1 | 12/2008 | Maksimovic et al. |
| 2012/0153917 A1* | 6/2012 | Adell .................. H02M 3/1588 323/283 |
| 2012/0223692 A1* | 9/2012 | Prodic .................. H02M 3/157 323/283 |
| 2015/0042310 A1 | 2/2015 | Gazsi et al. |
| 2015/0188405 A1 | 7/2015 | Ben-Yaakov et al. |
| 2016/0087544 A1* | 3/2016 | Jin ........................ H02M 3/156 363/21.02 |
| 2017/0126119 A1* | 5/2017 | Bernardon ............... H03K 7/08 |
| 2019/0028025 A1 | 1/2019 | Babazadeh et al. |
| 2019/0044442 A1* | 2/2019 | Schaef ................ H02M 3/1588 |

FOREIGN PATENT DOCUMENTS

| | | |
|---|---|---|
| JP | 60-087593 A | 5/1985 |
| JP | 2016-189636 A | 11/2016 |
| WO | WO 2018060990 | 4/2018 |

OTHER PUBLICATIONS

Abramov et al., "Optimal Design of a Voltage Regulator Based on Gyrator Switched-Resonator Converter IC", IEEE Journal of Emerging and Selected Topics in Power Electronics, Jun. 2018, vol. 6, No. 2, pp. 549-562.

Cervera et al., "Digital Self-Tuning Controller for ZCS Resonant Converters Operating in the 10MHz-Range", IEEE 18th Workshop on Control and Modeling for Power Electronics (COMPEL), Jul. 9, 2017, Stanford, CA, 7 pages.

Channappanavar et al., "Digital Current Hysteresis Controller Based on Wide Bandwidth Inductor Current Estimation", 2018 IEEE International Conference on Power Electronics, Drives and Energy Systems, Chennai, Tamilnadu, India, Dec. 18-21, 2018, 6 pages.

Extended European Search Report for corresponding European Application No. 20849225.6, dated Aug. 16, 2022, 11 pages.

* cited by examiner

DIGITAL ZERO-CURRENT SWITCHING LOCK-IN CONTROLLER IC FOR OPTIMIZED OPERATION OF RESONANT SWITCHED-CAPACITOR CONVERTERS (SCCS)

CROSS-REFERENCE TO RELATED APPLICATIONS

This application is a National Phase Application of International Application No. PCT/IL2020/050854, filed Aug. 4, 2020, which, in turn, claims the priority of U.S. Provisional Patent Application No. 62/882,530, filed on Aug. 4, 2019, both of which are hereby incorporated herein by reference in their entirety.

FIELD OF THE INVENTION

The present invention relates to the field of resonant-type converters. More particularly, the invention relates to a digital zero-current switching lock-in controller, for optimizing the operation of Resonant Switched-Capacitor Converters (RSCCs).

BACKGROUND OF THE INVENTION

Switched-Capacitor Converters (SCCs) which have been explored over the last two decades have a dominant role in power management in datacenters and other cloud computing related applications. In light of the acceleration of the standardization of the power delivery structure that has been heavily affected by the trend-leading Open-Computing-Project (OCP) consortium, the necessity to step the 48V rail down to 12V with extremely high efficiency and very high power density has established an application stand point, at which SCC technology and its derivatives is highly superior over the inductor-based alternatives.

Power density and conversion efficiency are of key importance in datacenters applications, so as to maximize the amount of computing power per volume. This requirement entails extremely strict performance requirements at conversion from 48V-to-12V level, so that it would not further deteriorate the attractiveness of the overall solution. Since this application requires a fixed conversion ratio, SCC technology renders a very attractive candidate. At medium power levels, SCCs have widely demonstrated peak efficiency over 98%. Results of Resonant Switched-Capacitor Based Power Converters (RSCCs) for datacenters applications have been recently presented, demonstrating peak efficiency of 98.5% around 200 W.

The primary factor that facilitates efficient power conversion for the general case of RSCC is the accuracy of the switching frequency with respect to the resonant conditions of the converter. Optimal charge transfer is achieved in case where the conduction time of each switching state matches exactly half of the resonator's period, so the deadtime between switching states is minimized. In this way, the charge of the flying capacitor is fully utilized during every cycle. Converter topologies with more frequent charge transfer of the output inherently introduce lower equivalent resistance. As a result, these topologies are potentially more efficient than topologies with the basic charge-discharge pattern.

For topologies that comprise multiple switching states to complete a charge cycle, or configurations with multiple resonators, full utilization of the charge out of each flying capacitor, every cycle introduces complexity to the circuit controller. Since the conduction path is different for every state, which changes the resonant period, accurate zero-crossing information of the flying capacitor current and specific timing settings is required per switching state (and in some applications, per individual switch). The resonant parameters per sub-circuit vary as a function of the stresses on the component, loading conditions, the physical layout of the design and drifts with temperature and over time. In addition, the timing parameters should be considered for components' variations and the accuracy of the current Zero-Crossing Detection (ZCD) circuit.

It is therefore an object of the present invention to provide a digital zero-current switching lock-in controller for optimizing the operation of Resonant Switched-Capacitor Converters (RSCCs).

It is another object of the present invention to provide a controller which, based on obtains the ZCD information, is capable of on-the-fly identifying the resonant period for each sub-circuit and locks-in to the correct switching time.

It is a further object of the present invention to provide a controller which is capable of automatically compensating any variation of the circuit.

Other objects and advantages of the invention will become apparent as the description proceeds.

SUMMARY OF THE INVENTION

A digital lock-in controller for Resonant-type converters with one or more sub-circuits having resonant tanks and one or more flying capacitors connected across the resonant tanks, comprising:
  a. an auto-tuner that receives as input Zero-Current Detect (ZCD) signals and implements a tuning algorithm by performing arithmetic operations that ensure Zero-Current Switching (ZCS) operation for all resonant tanks in the converter;
  b. a digital hybrid High-Resolution (HR) sequencer that receives as input the switching-times commands and generates a pulse-width-modulated signal that is fed into the gates of the converter's switching transistors;
  c. a sampling block with time resolution of a single delay-element, for accurately reading of the ZCD sensor's outputs; and
  d. a governor module for performing all synchronization actions and dictating the operation mode of the controller, based on auxiliary configurations.

The Resonant-type converter may be a Resonant Switched-Capacitor Converter (RSCC).

Complete ZCS operation may be obtained for single-stage or multi-stage RSCC topologies.

The resonant period of each sub-circuit may be identified on-the-fly and locks-in to the correct switching time to fully utilize the charge transfer rate for each flying capacitor.

The switching time of each sub-circuit may be modified on-the-fly, to compensate for any variations in passive components' values due to temperature or aging.

The controller may have an architecture that is based on all-digital standard-cells with a single supply domain without modifications, to be designed using a generic digital flow procedure.

The architecture implementation may be based on asynchronous hardware and combinatorial circuits, for eliminating the need for complex and power-consuming hardware for timing and high-speed synchronization.

The Auto-Tuner may be adapted to tune the switching time of each sub-circuit by receiving as input the ZCD signals and outputting the following auxiliary signals:

a. a digital word representing the switching-time for each sub-circuit of the RSCC, where the MSBs of the digital word corresponds to the coarse part of the drive signal to the RSCC transistors with time-resolution of the system's-clock switching-period and the LSBs of the digital word represents the fine part of the drive signals with time-resolution being equal to the delay of a single delay-element; and
b. a digital signal indicating the lock-in state of the controller:
   i. Inherent delay calculation during start-up;
   ii. lock-in to the correct switching-time of each sub-circuit;
   iii. in-process of the lock-in procedure of one or more sub-circuits.

The lock-in process to the resonance characteristics of each resonant tank may comprise:
a. operating according to user configurable gating-commands without compensation for a pre-determined number of switching-cycles;
b. calculating an inherent delay between the controller and the converter's transistors;
c. sampling the ZCD sensors to obtain the switching-state of each resonant tank (early- or late-switching);
d. calculating an error signal based on the acquired switching-state of the converter;
e. modifying the duration of the switching cycle for each resonant tank by:
f. increasing the duration in case early-switching is acquired; or
g. decreasing the duration in case late-switching is acquired;
h. calculating the converters switching period based on the results of step e. above;
i. updating the gating-command for each resonant-tank; and
j. repeating steps c.-f. above, until the controller is disabled.

The Auto-Tuner may comprise:
a. a digital compensation unit for evaluating the sampled ZCD signals and determining the required modification of the switching times;
b. a digital Low-Pass Filter (LPF) for smoothing noise variations and inaccurate reading of the ZCD sensors; and
c. a digital logic block for producing a digital representation of the controller lock-in state while being Locked.

The HR Sequencer may be adapted to:
a. receive as inputs the switching-time for each sub-circuit and a user configurable dead-time;
b. output the drive signals to the RSCC transistors with time resolution of a single delay-element.

The HR Sequencer may comprise:
a. a coarse-counting block based on digital counter, operating in the internal clock frequency;
b. a logic block being adapted to:
   b.1. receive as an input a first portion of bits representing the switching-time for each sub-circuit;
   b.2. generate, by a counter-comparator circuit, a time-base signal with a time-resolution being equal to the period of the system internal clock; and
c. a fine-adjustment block comprising a circuitry consisting of a combination of a delay-line and a multiplexer for each sub-circuit, the fine-adjustment block is adapted to:
   c.1. receive as input the LSB portion of bits representing the switching-time and the counter-based signals from the logic block; and
   c.2. generate a pulse-width-modulated signal that controls the gates of the RSCC transistors with time-resolution of a single delay-element.

The Sampling Block may comprise:
a. a combined delay-line-multiplexer unit;
b. a counter-comparator logic block;
the Sampling Block may be adapted to:
c. receive as input:
   c.1. auxiliary sampling configuration;
   c.2. a digital word representing the inherent delay between the HR Sequencer and the conduction of the RSCC transistors; and
d. produce valid readings of the ZCD sensors.

The sampling operation can be executed as a:
a. a synchronous procedure utilizing the system's internal clock by performing continuous sampling of the ZCD sensors at the internal clock's frequency from a turn-off command by the controller, until the end of the applied dead-time and processing the samples to acquire the converter's switching-state; and
b. an asynchronous procedure combining system's internal clock and a delay-line based module for high-resolution sampling with time-resolution of a single delay-element, where, the converter's switching-state is accurately acquired, based on the estimated inherent delay upon start-up, using a single sampling operation,
where, once the dead-time period is over, the sampling block provides the auto-tuner with the valid readings of the ZCD sensors.

The inherent delay between the controller's outputs and the RSCC transistors' conduction instance may be calculated upon start-up by:
a. defining default switching frequency according to the nominal values of the passive components of the resonant-tanks, to deliberately ensure early-switching in all sub-circuits;
b. sampling the ZCD sensors' outputs once every switching-cycle;
c. evaluating the acquired readings and modifying the sampling location accordingly;
d. repeating steps b-c above until a valid early-switching reading is acquired; and
e. estimating the inherent delay, based on the sampling-time at the end of the preceding step d.

The sampling operation may be executed independently, for each sub-circuit of the RSCC.

The Governor module may be adapted to:
a. receive as input the auxiliary configuration from a single-pin based Sigma-Delta Analog-To-Digital Converter (SD-ADC) configuration circuit;
b. dictate the desired operation mode of the converter, based on the auxiliary configuration, by executing:
c. a start-up routine for calculating the inherent delay;
d. a light-load operation, during which sampling and tuning operations are not carried out on a cycle-by-cycle basis to minimize power consumption; and
e. a normal operation mode,
wherein all synchronization actions performed by the Governor are based on the internal system's internal clock and based on the information regarding the tuning process provided by the Auto-Tuner block, while being Locked.

The single-pin based SD-ADC may comprise:
a. A Sigma-Delta modulator with digital front-end;
b. an inverter-based comparator;
c. a simplified RC integrator; and
d. a counter based decimation and filtering output stage,
wherein the single-pin configuration circuit produces a digital word as a function of the voltage at the input of the front-end inverter.

The ZCD may comprise a two-comparator based sensor architecture, being capable of accurately determining the polarity of the resonant-tank current at the sampling instance, wherein ZCD sensors are placed in the switching node of each sub-circuit to produce a digital representation of the polarity of the resonant-tank current at the sampling instance.

A method for controlling Resonant-type converters with one or more resonant tanks and one or more flying capacitors connected across the resonant tanks, comprising the steps of:
a. performing, by an auto-tuner that receives as input Zero-Current Detect (ZCD) signals, arithmetic operations that ensure Zero-Current Switching (ZCS) operation for all resonant tanks in the converter, to implement a tuning algorithm;
b. generating, by a digital hybrid High-Resolution (HR) sequencer that receives as input the switching-times commands, a pulse-width-modulated signal that is fed into the gates of the converter's switching transistors;
c. accurately reading of the ZCD sensor's outputs by a sampling block with time resolution of a single delay-element; and
d. performing all synchronization actions and dictating the operation mode during control operation, based on auxiliary configurations.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

The present invention proposes a lock-in integrated controller for resonant SCC. The controller identifies the resonant period of each sub-circuit on-the-fly and locks-in to the correct switching time to fully utilize the charge transfer rate for each flying capacitor. The controller includes an auto-tuner and a sequencer, which accommodate any mismatch, variations or drifts of component values or circuit configuration and performs tuning for each resonator independently to fully utilize the charge transfer for each flying capacitor in the system. A full-scale hardware prototype of 650 W 4:1 switched-tank-converter is used to validate the controller's operation, demonstrating excellent lock-in capabilities resulting in high efficiency of up to 98.6%.

Figure 1:
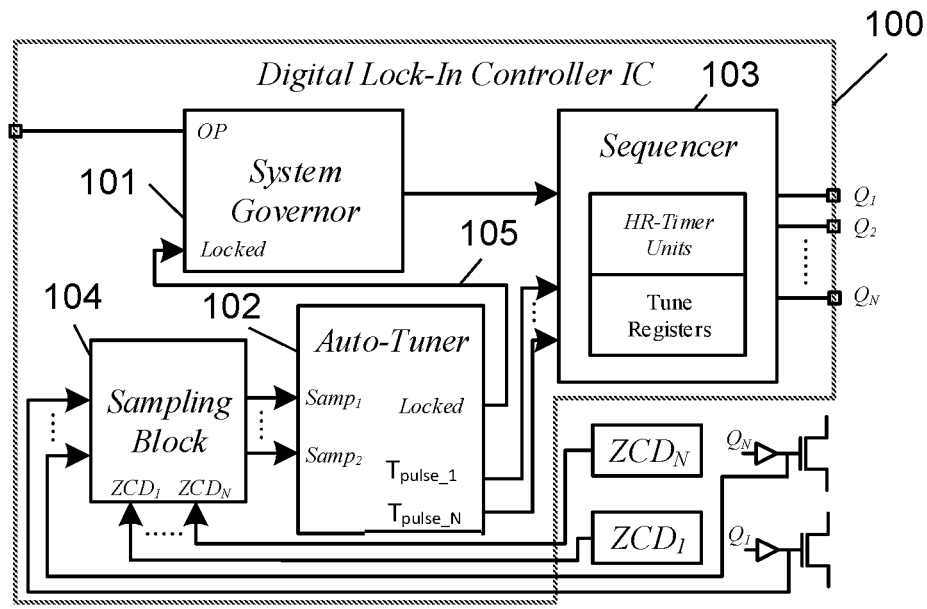
FIG. 1 illustrates a simplified schematic diagram of the digital lock-in controller IC.

FIG. 1 schematically illustrates a lock-in integrated controller architecture that allows accurate switching timing to fully utilize the charge transfer for each flying capacitor at every switching state. The controller is implemented as an all-digital IC which adjusts to accommodate any mismatch, variations or drifts at component values or the circuit configuration.

Two lock-in architectures are presented. A first lock-in architecture is based on synchronized digital hardware and is suitable for medium frequency range applications (in the range of several hundred KHz). A second lock-in architecture is based on asynchronous combinatorial logic and provides very high frequency resolution which qualifies to the MHz range. The control method is demonstrated for two resonators, with individual independent tuning per sub-circuit and switching state.

FIG. 1 illustrates a general form of the proposed digital lock-in controller that can be applied to various types of RSCC-based single or multi-stage converters topologies. The controller comprises a system governor module 101, for managing, synchronizing and dictating the operation mode; an auto-tuner module 102 for adjusting and calibrating the conduction time of the switches to achieve Zero-Current-Switching (ZCS) operation in all resonant tanks; A switching sequencer 103 for generating the required drive signals to the power switches; a sampling block 104, for accurate reading of the Zero-Current-Detection (ZCD) sensors' outputs.

One possibility for tuning the drive frequency to the resonant characteristics can be performed by immediate response to the information from a zero-crossing point sensor. This method may be problematic for some cases due to latencies and delays in the system.

An alternative approach that is utilized for high switching frequency applications performs delay-locked-loop convergence of the switching frequency to the resonant frequency. Such an alternative approach locks-in to the desired running frequency and compensates for any variations or mismatches in the system. This operation suits well resonant conversion, in particular at high-Q, since the response of the system to variations is rather slow and carries on over several switching cycles. In the context of the present invention, the main motivation of the tuning process comes from thermal considerations, to achieve optimal transfer conditions which result in the highest efficiency conditions of the system, is a relatively slow-varying objective that can be fulfilled well with a lock-in tuning architecture.

The tuning process is performed by a relatively slow internal clock of the controller IC, resulting in a simple and straightforward realization of the Sequencer and the Sampling blocks. For converters operating at higher frequencies, the frequency detection and generation units were realized using asynchronous combinatorial logic, to allow operation with higher resolution than of the one obtained by the internal synchronous clock.

The Governor (Control) Module 101

The governor module 101 dictates the desired operation mode of the converter, based on auxiliary configuration (via OP port in FIG. 1). For a conventional RSCC, the governor module decisions include light-load operation of the converter, start-up and turn-off sequences as well as the applied dead-time. For more complex topologies, the governor module 101 may dictate various switching schemes to minimize on-board periphery such as ZCD sensors in multi-stage converters, and even to determine the voltage conversion ratio. In the present invention, all synchronization actions performed by the system governor module 101 are based on an internal clock (in this specific case is 20 MHz). A feedback 105 from the auto-tuner block 102 (Locked in FIG. 1) provides the governor module 101 with the required information regarding the tuning process. To support wide range of resonant converters, start-up and turn-off sequences can be re-programmed with no hardware modifications.

The Auto-Tuner Module 102

Figure 2:
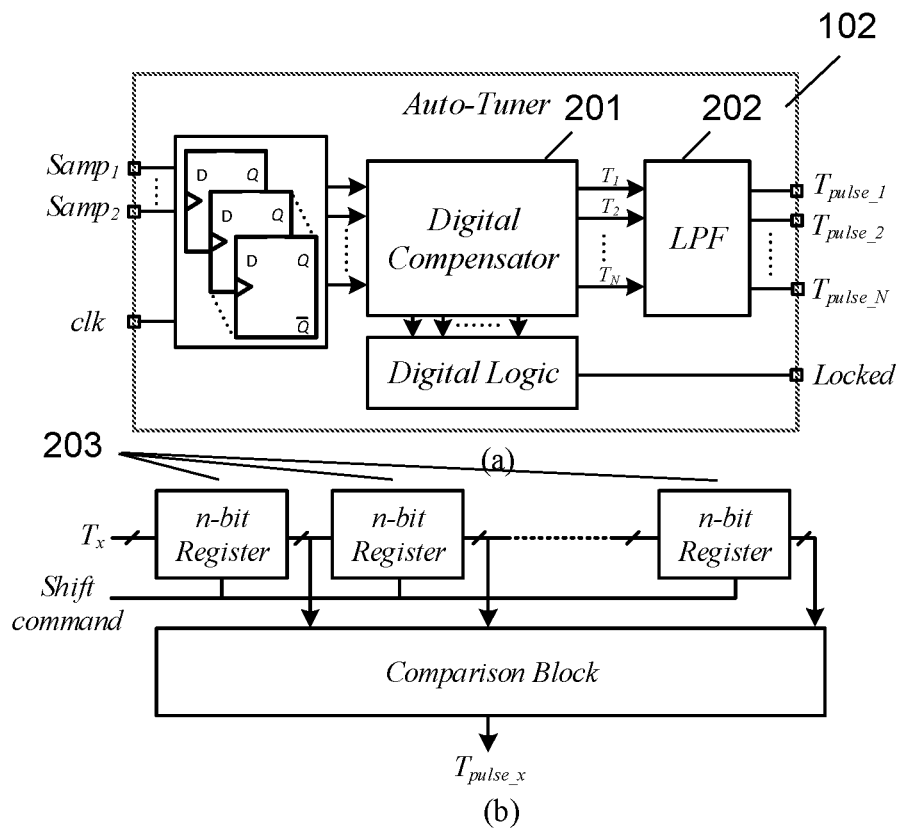
FIG. 2A is an internal block-diagram of the auto-tuner module.
FIG. 2B is a simplified block-diagram of the LPF.
Figure 3:
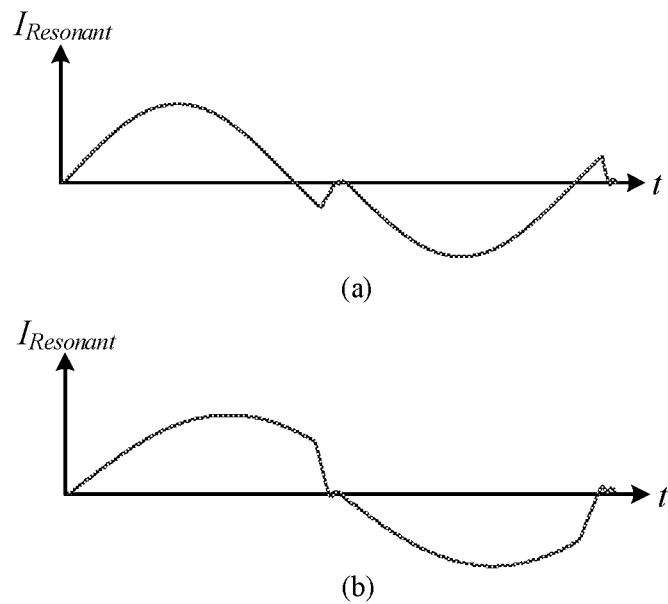
FIG. 3A illustrates late switching.
FIG. 3B illustrates early switching.

The auto-tuning module 102 consists of several internal units, as shown in FIG. 2A. A digital compensator 201 evaluates the sampled ZCD signals and determines whether the resonator current is zero when the transistor turns off. Non-zero resonant current at transistor turn off will occur in case of 'early' or 'late' switching, as illustrated in FIGS. 3A-3B. Based on the information of the polarity of the current at turn-off, the compensator 201 modifies the on-time for each resonant tank separately (Tx in FIG. 2B). The on-time of the next switching cycle is increased in case the sampled ZCD signal indicates 'early' switching and decreased in case of 'late' switching indication. Once the sampled signal of the ZCD indicates ZCS, the on-time remains unchanged. The initial values that the unit start the process with can be programmed in advance, or can be used as default, depending on the length of the start-up tuning procedure that is allowed.

The compensator block 201 is followed by a digital LPF 202 for smoothing any noise variations, and it also functions as a possible degree of a compensation network, in cases where additional lagging phase is required. In this example, filtering is performed by comparing a configurable number of compensator outputs, as shown in FIG. 2B. At the beginning of each switching cycle, a shift operation is performed on the registers 203 and the output of the LPF filter 202 is calculated ($T_{pulse\_x}$ in FIG. 2A). The tune-registers are updated only when all registers hold the same value, which completely eliminates the effect of singular non-ZCS events or inaccurate indications of the ZCD sensors on the converter's operation.

The auto-tuner module 102 allows flexible choice of the resonant tank values which determine the operating frequency of the converter. At power-up, a lock-in routine is initiated, during which the auto-tuner module 102 locates the resonance frequency of each tank. During normal running mode, the auto-tuner module 102 observes the operation of the power-stage and provides fine-tuning, to ensure ZCS in case the passive components drift from their values upon start-u p.

The Sequencer Module 103

The sequencer module 103 executes the gating signals $Q_1, \ldots, Q_N$ to the power stage, based on the information from the preceding modules. It incorporates a multi-phase high-resolution timer to ensure correct and precise pulse-length for single or multi-stage converter topologies. The gating signals $Q_1, \ldots, Q_N$ are set independently per resonator (or sub-circuit) of the converter, so that ZCS operation can be separately realized per all resonant tanks or stages of a converter, regardless of component mismatches or variations.

Figure 4:
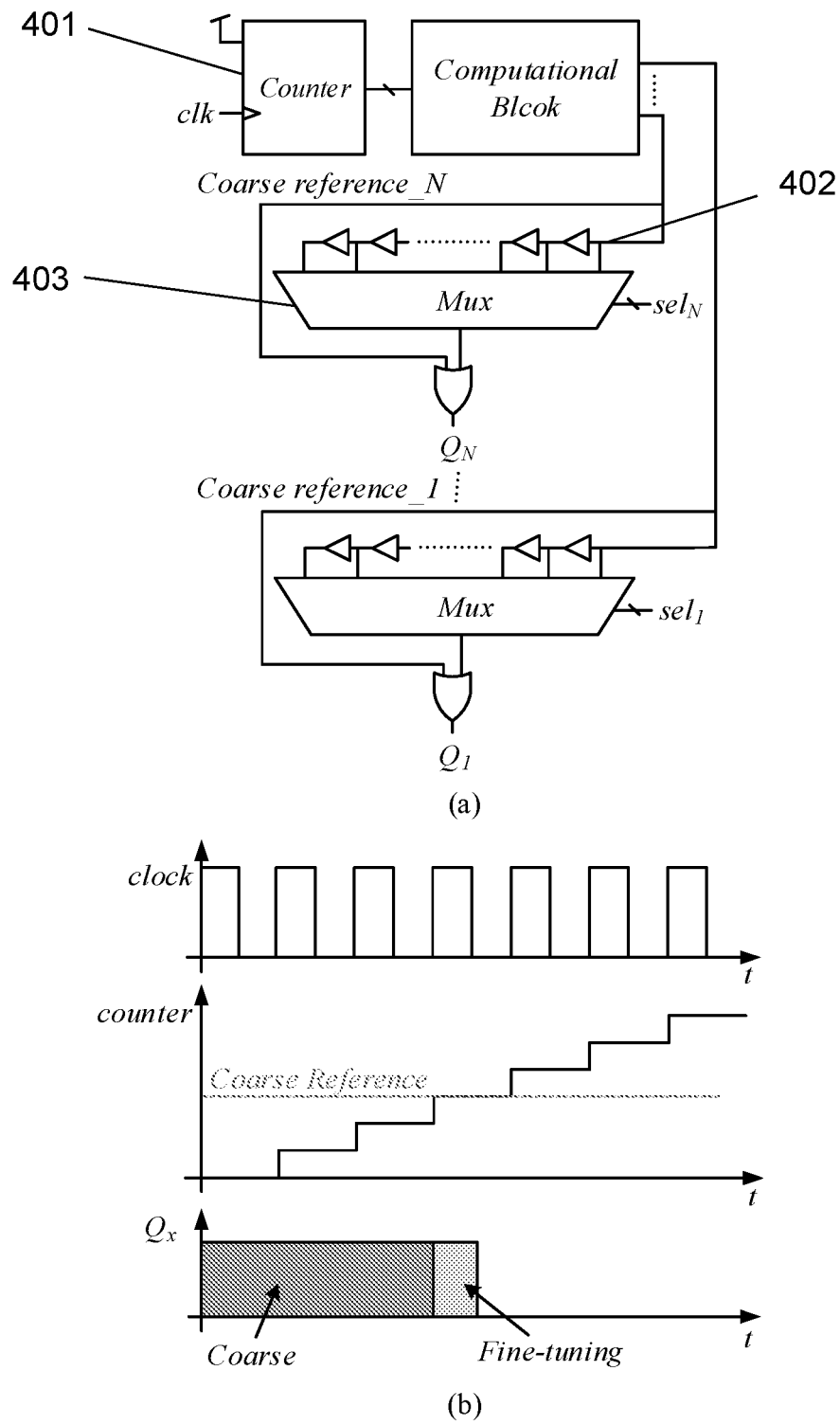
FIG. 4A is a simplified block diagram of the sequencer module.
FIG. 4B shows a delay-line based high-resolution PWM signal.

The conventional approach to implement a high-resolution timer is by a fast-clock counter-comparator scheme. In this way, n-bit resolution at a switching frequency of fs requires a reference clock frequency of $2^n \cdot f_s$, which translates to increased power consumption. In this example, the high-resolution pulse-width drive signals for the power switches are produced by incorporating a coarse-counting block 401, followed by a fine-tuning delay-line based module 402, as shown in FIG. 4A. This allows a design that is based on standard cells, and enables direct synthesis with low power consumption. As can be seen in FIG. 4A, a counter-based signal is generated independently for each resonant tank by the information provided from the auto-tuner block. This signal is then delayed by the delay-line 402 to achieve the exact on-time for ZCS operation of all resonant tanks by setting the input of each multiplexer 403 according to its self command, which is supplied by the auto-tuner 102, as shown in FIG. 4B. Protection logic and other gating-related features are also incorporated in this sequencer module 103, to allow full completion of a sequence and to avoid overlapping of signals in case the resonant tanks operate with different drive sequences. The time resolution of the sequencer block 103 is identical to the propagation delay of the buffer-cells used with some additional delay caused by the multiplexer 403. Matching the time-resolution of all drive signals, is achieved by placing all delay-lines in proximity to one another. By doing so, any variations caused by temperature or fabrication faults are eliminated.

The Sampling Block 104

Inherent delay between the generated gating signals in the controller and the actual conduction of the transistors is quite common for all switch-mode applications. This delay, from a controller point of view, is generally unknown and may significantly vary as a function of the operating point or the passive components, driving circuitry and power transistors used. The information regarding the polarity of the resonant current at transistor turn-off, which is the indicator for early or late switching of the transistors, is only valid in proximity to the switching event. Sampling the ZCD sensors must be able to compensate, or at least consider this inherent delay so that an accurate status information is obtained, i.e. early or late switching.

Figure 5:
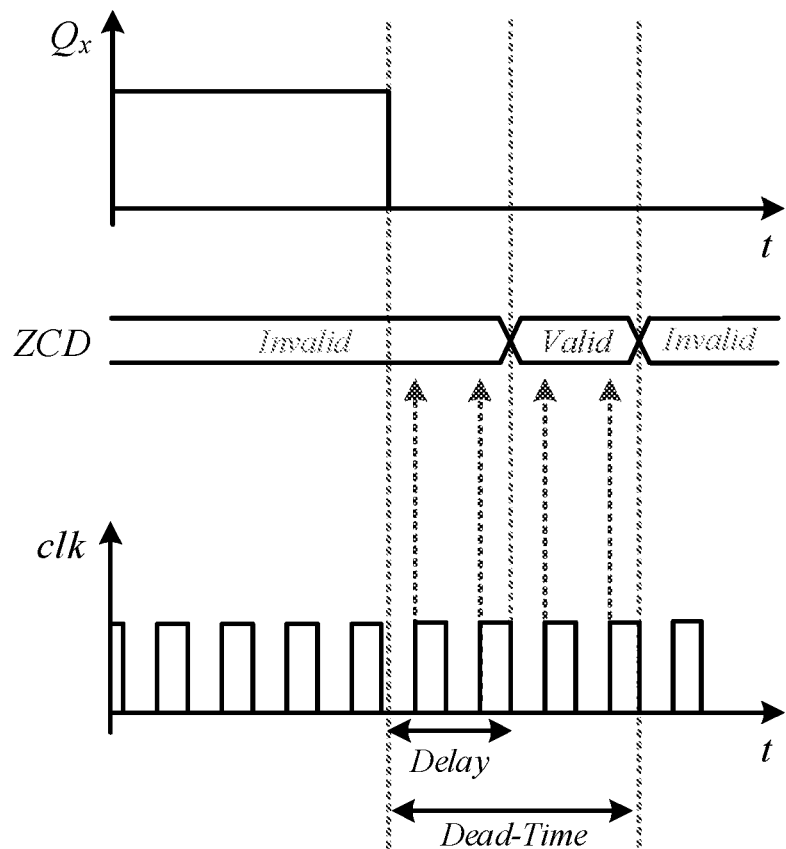
FIG. 5 shows a continuous-sampling based approach of the ZCD sensors.

In this example, two completely synthesizable approaches have been realized to acquire the information from the ZCD sensors while accounting for the above-mentioned delay. The first approach is based on continuous sampling of the ZCD sensors at the internal clock's frequency from the turn-off command by the controller until the end of the applied dead-time period, as shown in FIG. 5. Here, the ZCD sensor is sampled at the beginning of each clock cycle and the acquired result is processed according to a state-machine algorithm to acquire the converter's switching-state. Once the dead-time period is over, the sampling block 104 provides the auto-tuner 102 with the valid readings for further processing and tuning operations.

Figure 6:
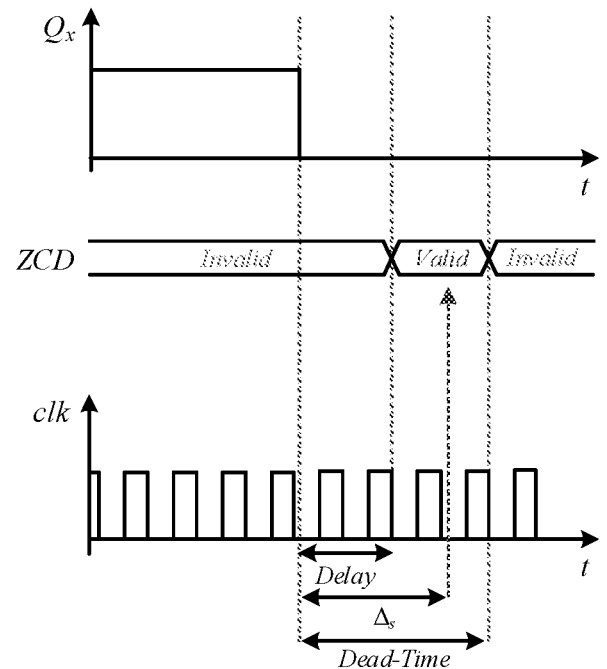
FIG. 6 shows a single-sample based approach of the ZCD sensors.

The second approach requires less computational efforts during the sampling process, yet still allows sampling with greater proximity to the switching action to further minimize charge losses due to late or early switching of the transistors. This is performed by incorporating a delay-estimation logic, which accurately estimates the inherent delay upon start-up, illustrated as Δs in FIG. 6, in addition to a delay-line based structure which generates a sampling signal with a resolution of a single delay-element. Once the ZCD sensors are sampled, the sampling block 104 provides the auto-tuner 102 with the acquired readings for further processing and tuning operations.

Charge Transfer Rate Analysis

Figure 7:
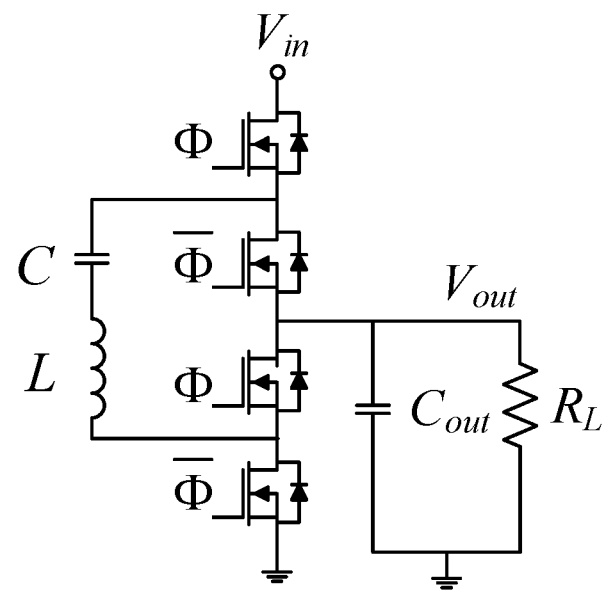
FIG. 7 shows a conventional 2:1 RSCC.
Figure 8:
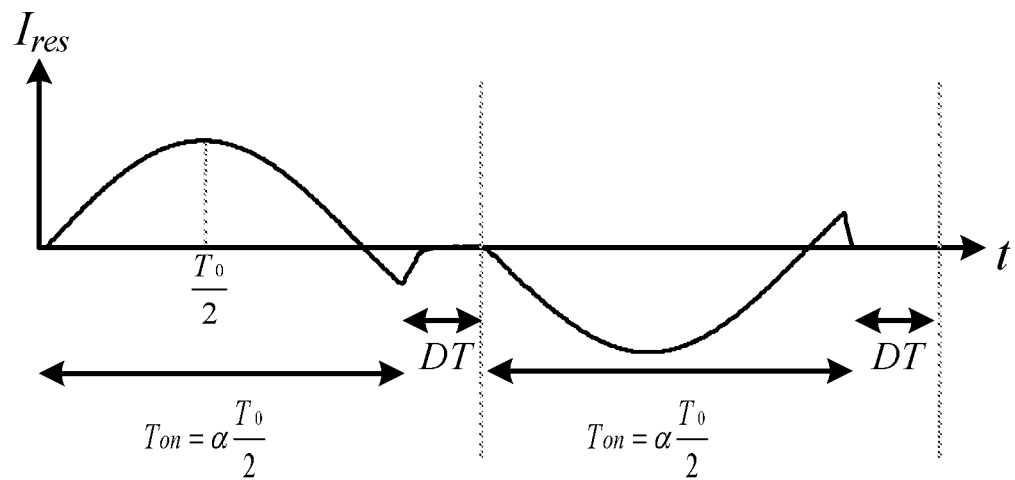
FIG. 8 shows the resonant tank current during late-switching operation.

A mathematical derivation of the charge transfer rate to the load is given for a conventional 2:1 RSCC, as shown in FIG. 7. An illustration of the resonant current is shown in FIG. 8, for a case of late-switching operation, but the same analysis applies for the case of early-switching without any modifications.

The resonant characteristics of the converter are derived from its passive components' values, and can be expressed as:

$$f_0 = \frac{1}{2\pi\sqrt{LC}}; T_o = \frac{1}{f_0}. \tag{1}$$

Including a short dead-time period between each switching state (DT in FIG. 8), the switching period is obtained by the following:

$$T_{sw}=2t_{on}+2DT \tag{2}$$

where $t_{on}$ is the conduction time during each phase of the switching period $\Phi$ or $\bar{\Phi}$). The resonant current can be described with the aid of (1) and (2) as:

$$I_{res}(t) = \begin{cases} I_{peak} \cdot \sin(2\pi f_0 t), & 0 < t < \alpha\frac{T_0}{2} \\ 0, & \alpha\frac{T_0}{2} < t < \frac{T_{sw}}{2} \end{cases}, \tag{3}$$

where $\alpha$ represents the switching mode of operation. In the case of $\alpha<1$, the converter operates in early-switching while late-switching occurs in cases where $\alpha>1$. ZCS operation is obtained when $\alpha=1$.

The output DC current equals the average resonant current during each of the switching phases, therefore the following equation holds:

$$\frac{1}{T_{sw}/2}\int_0^{T_{sw}/2} I_{res}(t)dt = I_{out}. \tag{4}$$

By integrating (4), the peak value of the resonant current can be extracted, expressed as:

$$I_{peak} = \frac{I_{out} \cdot \pi \cdot f_0 \cdot T_{sw}}{1-\cos\left(2\pi f_0 \frac{\alpha T_o}{2}\right)}. \tag{5}$$

The charge transferred to the load during half of a switching period is derived by integrating (3), as follows:

$$Q = \frac{I_{peak}}{2\pi f_0}(1-\cos(\alpha\pi)). \tag{6}$$

The value of $\alpha$ that results in the maximum charge transferred to the load is obtained by taking the derivative of (6) with respect to $\alpha$ and equating the result to zero. Solving the resultant equation yields that maximum charge is transferred to the load in the case of α=1, which correlates to the case of ZCS.

Figure 9:
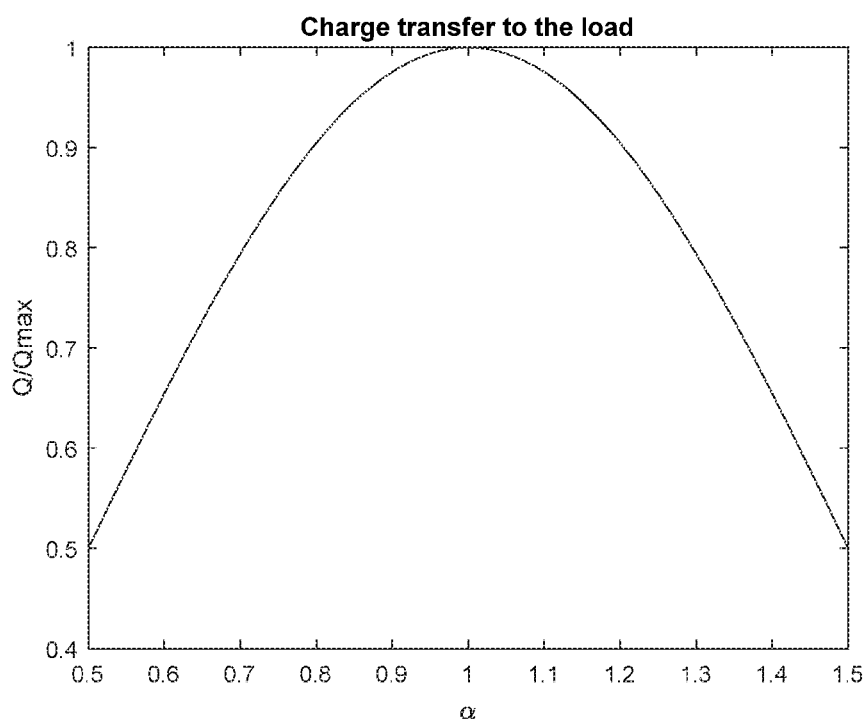
FIG. 9 shows the charge transferred to the load as a function of the converter switching-state.

FIG. 9 shows the relation between the charge transferred to the load as a function of the converter switching state for a given value of peak resonant current. The same analysis also applies for multi-stage RSCCs, in which maximum charge transfer rate to the load occurs if ZCS operation is obtained for all resonant tanks.

4:1 STC Control and Simulation Example

As described above, the on-time for each resonant tank is modified by the auto-tuner 102 to achieve ZCS operation based on the polarity of the resonant current at turn-off. The operation of the controller is demonstrated for a 4:1 Switched-Tank-Converter (STC), which comprises two resonators (in this example, $C_{r1}$; $L_{r1}$ and $C_{r2}$; $L_{r2}$) independently tuned to achieve full ZCS operation, as shown in FIGS. 10A and 10B.

Figure 10:
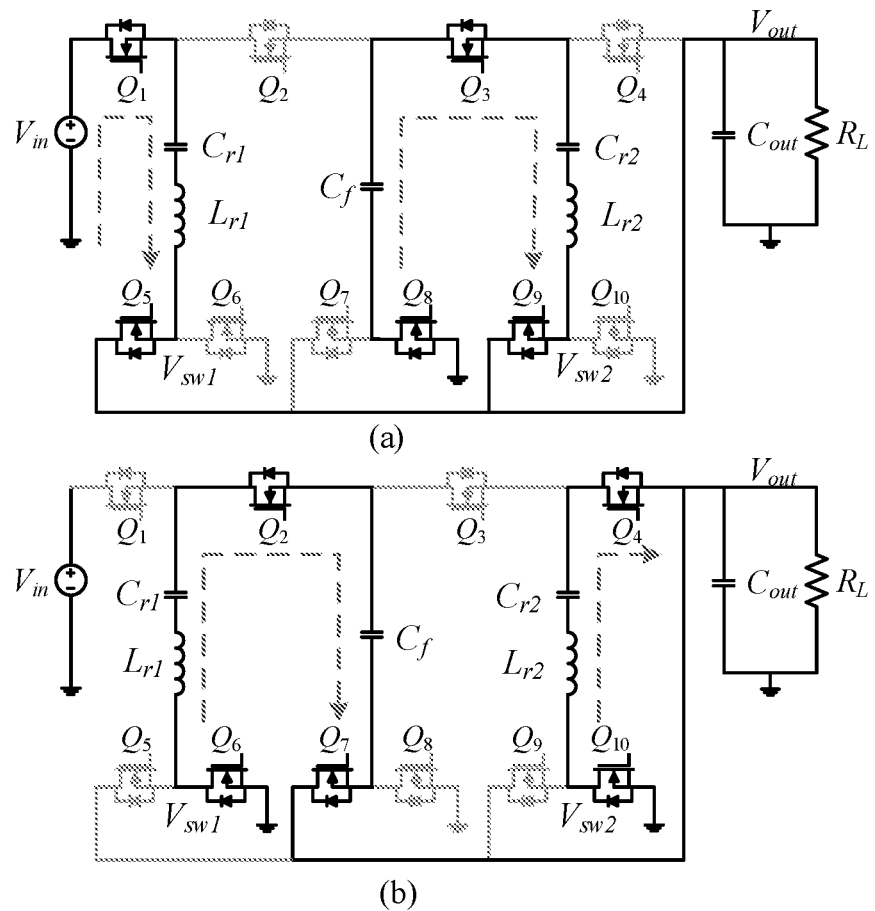
FIG. 10A shows an equivalent circuit of the 4:1 STC during charging operation of the resonant tank.
FIG. 10B shows an equivalent circuits of the 4:1 STC during discharging operation of the resonant tanks.

The operation of the STC can be divided into two states—charging or discharging of the resonators, as shown in FIG. 10A and FIG. 10B, respectively, with a short dead-time period between them. The flying capacitor $C_f$ (intermediate element in FIG. 10) connects to a different resonator at each active sub-circuit, resulting in charge transfer from the input to the output. Soft-charging is achieved for all capacitors in the system, and soft-switching of all switches can be achieved, for allowing the correct timing, dictated by the controller. For the case of 4:1 conversion ratio STC, illustrated in FIG. 10, the voltages at Vsw1 and Vsw2 are a direct indicator to the current polarity at turn-off. In case of early switching, the resonant current is flowing towards Vsw1 or Vsw2 (as shown in FIG. 10A) and the voltages are clamped to $V_{out}+V_F$ (where $V_F$ is the forward voltage of the transistor's body diode). The same applies to the case of late switching, where the current is flowing from Vsw1 or Vsw2 (as shown in FIG. 10B). Here, the voltages will be equal to −VF. Therefore, the ZCD inputs to the controller are obtained from Vsw1 or Vsw2.

Figure 11:
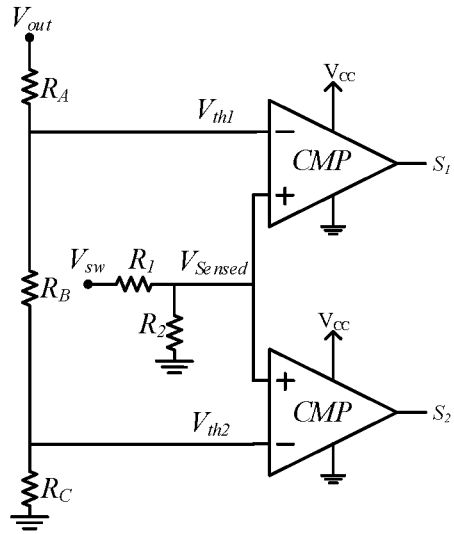
FIG. 11 shows a two-comparator based ZCD sensor, which produces a 2-bit representation of the switching-node voltage.

FIG. 11 shows a two-comparator based ZCD sensor, which produces a 2-bit representation of the switching-node voltage. Two reference voltages are produced as a function of the output voltage (Vth1 and Vth2 in FIG. 11), which feed the upper and lower comparators negative inputs, respectively. This configuration acts as a thermometric coder. The ZCD sensor produces a 2-bit result indicating late-switching (2'b00), early-switching (2'b11) or ZCS operation (2'b01), which is the input to the auto-tuner module 102, shown in FIG. 1.

The ZCD sensor's resistors ($R_A$, $R_B$, $R_C$) are chosen according to the following:

$$\frac{R_C}{R_B+R_C+R_A} < \frac{R_2}{R_1+R_2} < \frac{R_B+R_C}{R_B+R_C+R_A}, \quad (7)$$

where $R_1$ and $R_2$ determine the gain of the sensed switching node and $R_A$, $R_B$ and $R_C$ determine the reference window. The ZCD sensor tracks the output voltage and produces the reference voltages so that convergence to ZCS is guaranteed, regardless of the switching-state (i.e. early-or late-switching) upon start-up. The controller observes the status of the ZCD sensors after transistor turn-off and the on-time for each tank is modified accordingly, by the compensator 201 (shown in FIG. 2).

Figure 12:
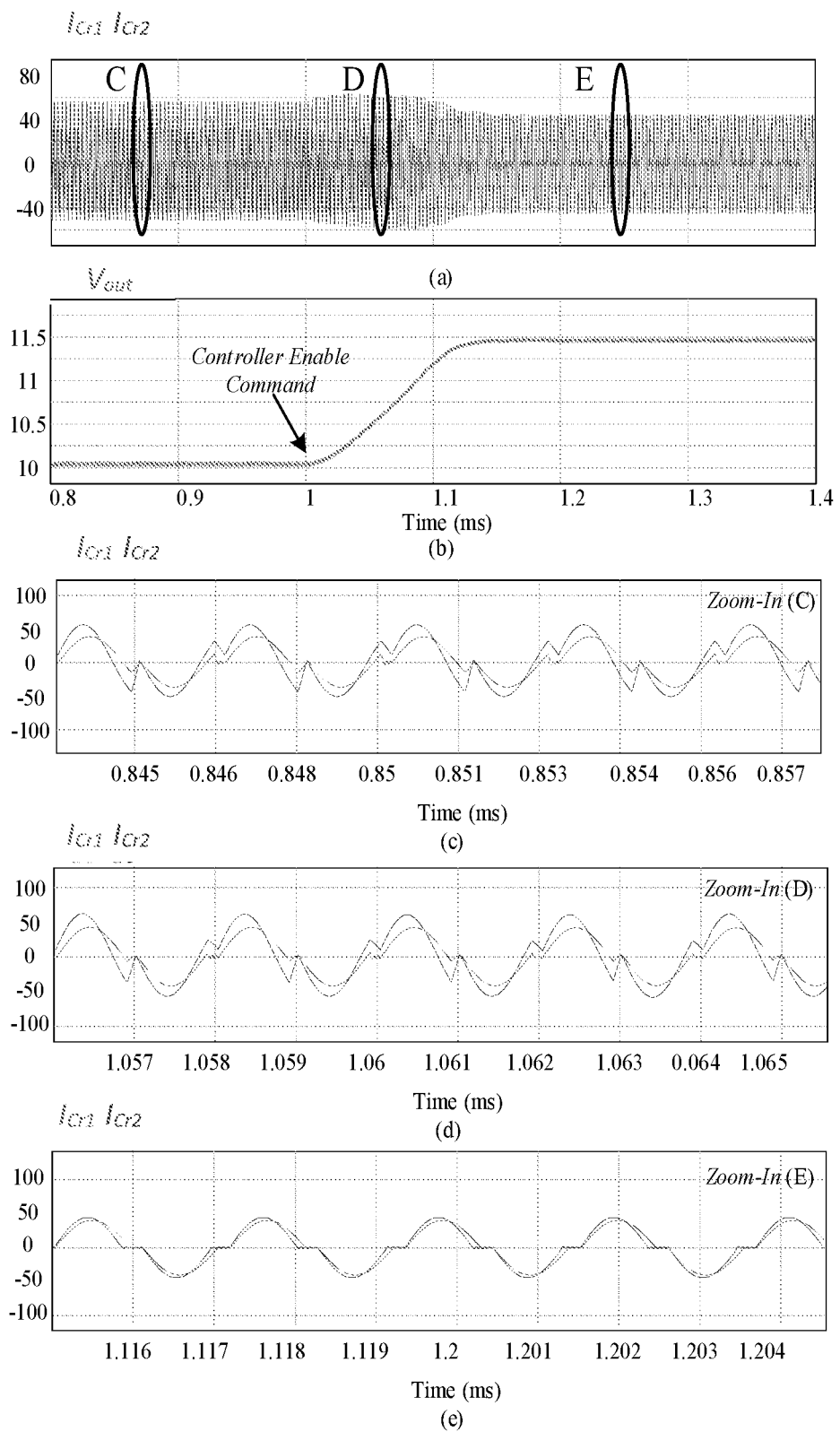
FIG. 12A shows the resonant currents during closed-loop operation of the controller for a 4:1 STC converter.
FIG. 12B shows the output voltage during closed-loop operation of the controller for a 4:1 STC converter.
FIG. 12C shows a zoom-in view on the resonant currents before controller enable command.
FIG. 12D shows a zoom-in view on the resonant currents during the convergence period.
FIG. 12E shows a zoom-in view on the resonant currents at steady-state.

The verification of the controller operation has been carried out on a 48V-12V STC converter by a set of simulations conducted in PSIM (PowerSim, Inc. Rockville, MD, U.S.A.); the parameters of the nominal values of the passive components are: Cr1=2.35 μF, Lr1=70 nH, Cr2=2.1 μF, Lr2=63 nH, RL=0.26Ω. Results of the lock-in tuning process are shown in FIG. 12A-12E, demonstrating convergence onto tuned conditions from off-tune starting points of both resonators, where FIG. 12c, FIG. 12d and FIG. 12e are a zoom-in of the area marked C, D and E in FIG. 12a, respectively. It can be seen that the output voltage increases to approximately 12V, which is the no-load target voltage, indicating that in the context of optimal charge transfer, the controller adequately fulfills its task.

In complex controller ICs where pin-count is an important asset and it is required to provide access to a large number of operating modes, a single-pin setup is essential. This implies that programming, mode selection, or values setting is carried out according to the voltage level that is imposed on the input pin. The amount of levels that can be utilized in this approach depends on the voltage span allowed on the input, resolution and accuracy of the detection unit. The single-pin configuration is facilitated in this study by a Sigma-Delta (SD) modulator (according to a method for encoding analog signals into digital signals as found in an analog-to-digital converter) and digital logic as shown schematically in FIG. 13.

The SD modulator has been realized with simplified hardware to reduce complexity and the effective silicon area. This may slightly deteriorate performance or conversion speed, but since the objective of this ADC is to acquire static, or semi-static, voltage levels, the solution fits well within the specifications.

Figure 13:
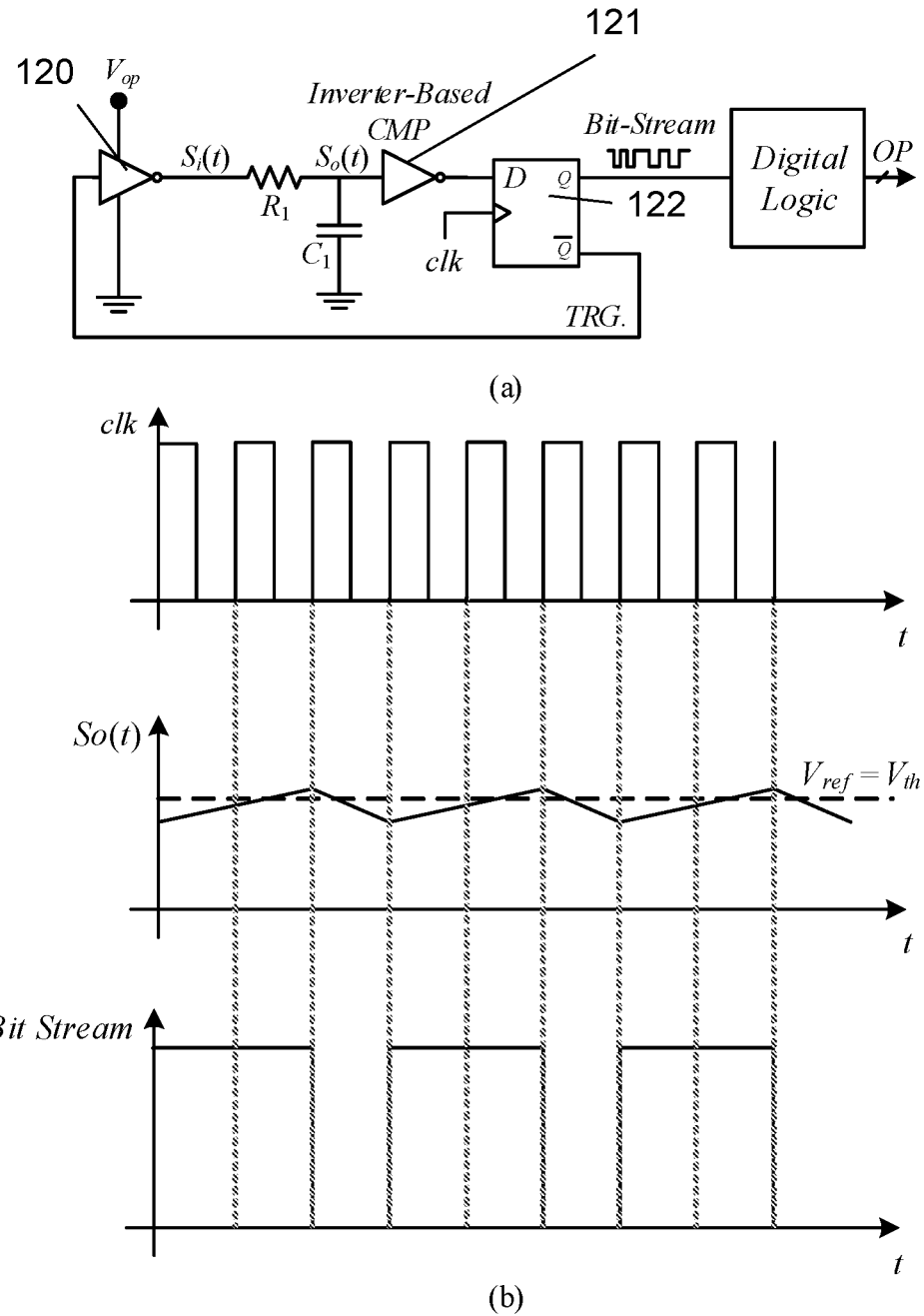
FIG. 13A is a simplified architecture of the single-pin configuration hardware.
FIG. 13B shows the SD modulator's key waveforms.

FIG. 13 shows a modulator front-end that is realized by a digital inverter 120, with $V_{op}$ as the high logic level (supply voltage). The integrator is realized by a simple $R_C$ network (R1;C1) with a corner frequency of at least one order of magnitude lower than the clock frequency. A quantizer is realized by another digital inverter 121. The result is then held by a D-flipflop 122 to facilitate a clocked bit-stream and to generate the oversampling frequency of the ADC. The resultant SD-based ADC is a hardware-efficient voltage level translator, the average voltage at node So(t) can be expressed as:

$$\overline{S_o(t)} = V_{ref} = V_{op} \frac{CNTR_n}{2^n}, \quad (8)$$

where Vref is the reference value for the modulation process (the threshold voltage of the inverter-based comparator) and CNTRn is the number of logic-high occurrences in the bit stream for 2n clock cycles. An illustration of the voltage at the input of the inverter-based comparator, So(t), is shown in FIG. 13B along with the resultant bit-stream and the oversampling-clock.

The bit-stream is the input to the computational logic which counts the amount of "1"s (equals to CNTRn) with a dedicated counter which acts as a sinc LPF, and resets at pre-defined intervals to perform decimation. In this example, the voltage applied on the front-end inverter is translated to a digital representation every 1024 clock cycles, which results in a 10-bit representation of the desired operating mode of the controller.

Figure 14:
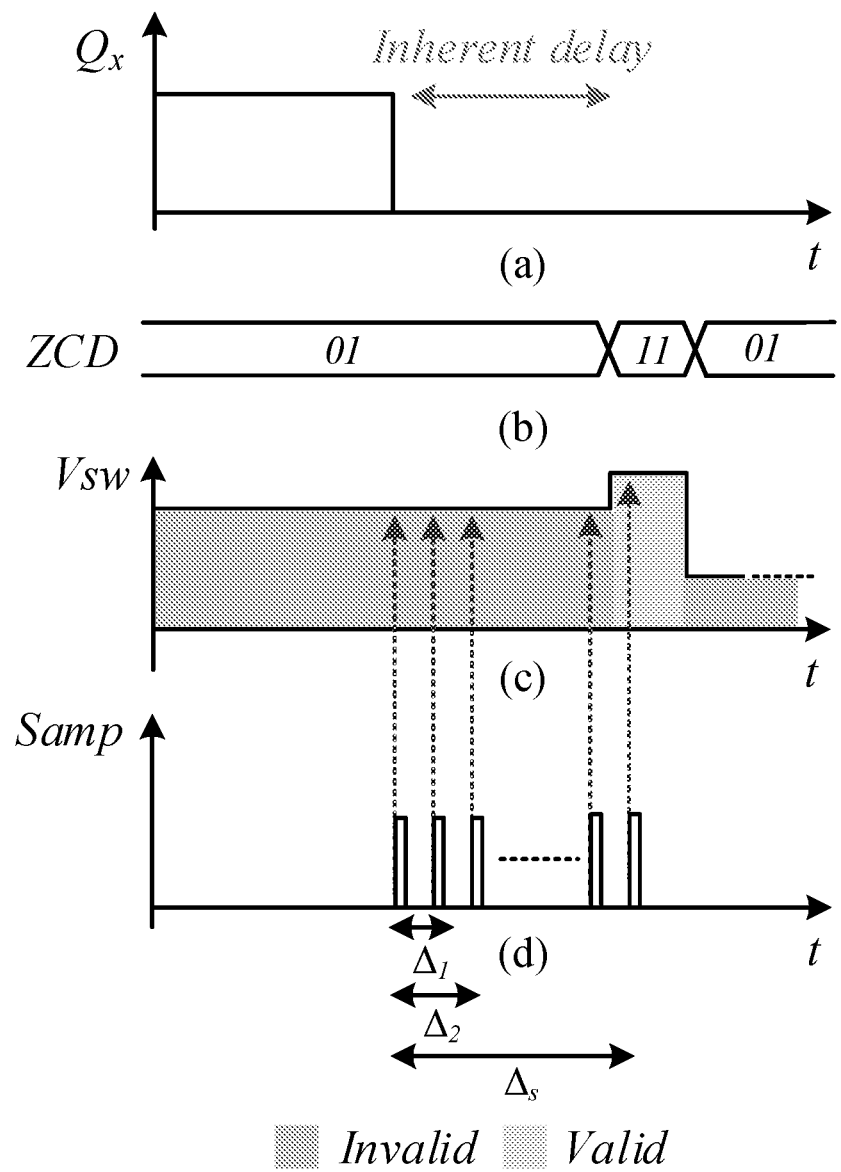
FIG. 14A shows waveforms of the controller gating signal during the inherent delay calculation procedure.
FIG. 14B shows waveforms of the ZCD sensor during the inherent delay calculation procedure.
FIG. 14C shows waveforms of the switching node during the inherent delay calculation procedure.
FIG. 14D shows waveforms of the sampling signals during the inherent delay calculation procedure.

Estimation of the inherent delay between the gating signals of the controller and the actual turn-off of the power transistors is performed upon start-up and every $N_{est}$ STC switching cycles to consider variations of the passive components ($N_{est}$ is set by the configurable inputs of the controller, OP in FIG. 1). Upon initiation of the delay estimation procedure, a pre-defined switching frequency is applied to both tanks, so that early-switching operation is ensured. As a result, the voltage at the switching nodes, $V_{sw1}$ and $V_{sw2}$, is clamped to be $V_{out}+V_F$ when the power stage transistors are turned-off at the end of the charging phase, as shown in FIG. 14. To estimate the inherent delay, a sampling the ZCD sensor is performed once every switching cycle in different locations (Δx in FIG. 14) until the early-switching reading from the ZCD sensor is acquired (2'b11), as shown in FIGS. 14B-14D. The inherent delay Δs is estimated to be the minimum delay between the controller gating signals and a sampling command that acquires a valid reading from the sensor. For practical reasons, an additional small configurable delay is added to the measured Δs.

A digital controller IC for RSCC has been designed and fabricated in 0.18 μm 5V process. The IC layout was with overall die area that is pad-limited at 4 mm², while the effective silicon used is 0.64 mm².

Figure 15:
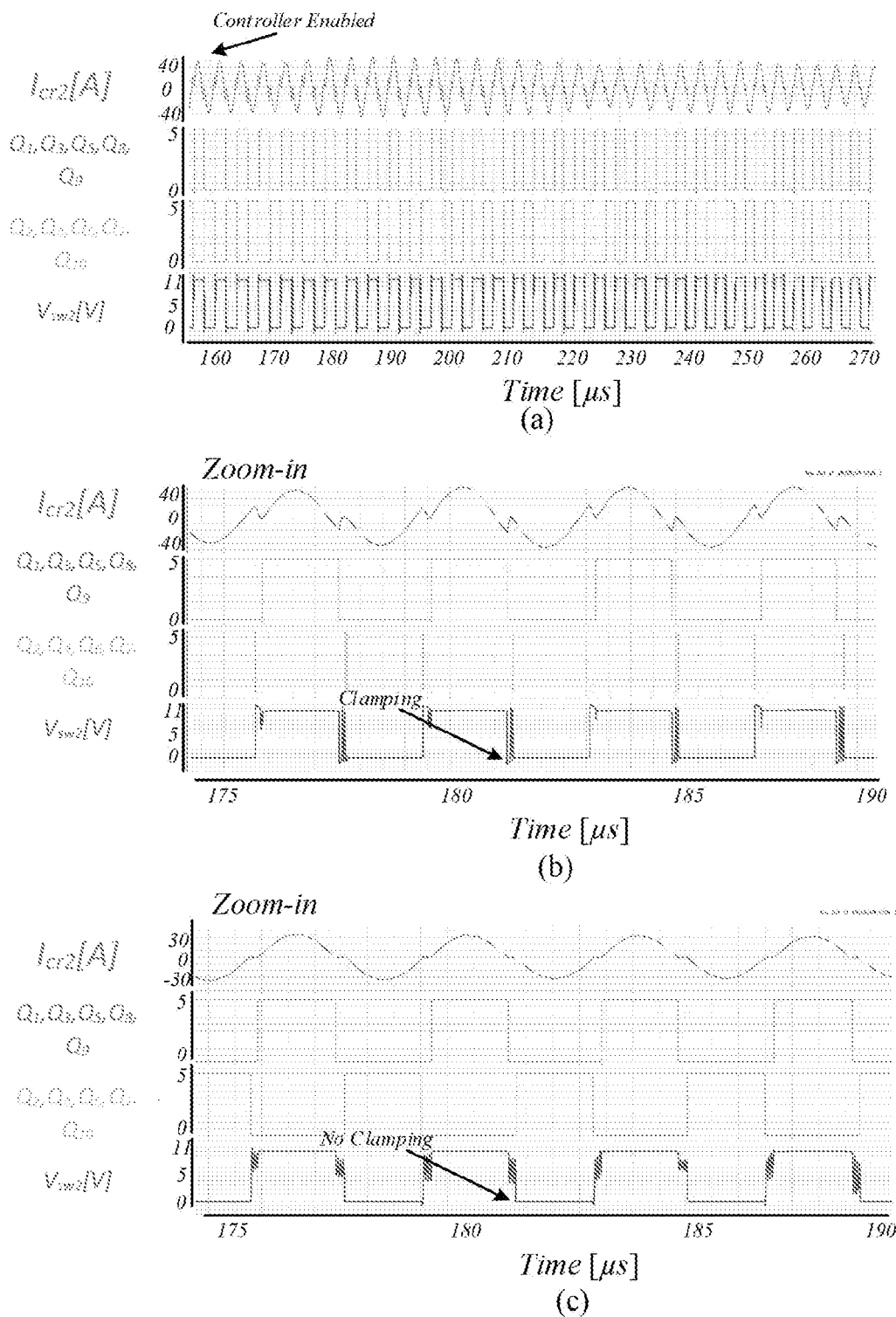
FIG. 15A is a post-layout simulation of a transition from late-switching to ZCS.
FIG. 15B is a post-layout simulation of open-loop operation.
FIG. 15C is a post-layout simulation of after convergence to ZCS operation.

The operation of the controller IC has been verified prior to fabrication with post-layout simulations using Cadence Virtuoso, where the IC connects to a 4:1 STC converter with a 48V input voltage feeding a resistive load of 0.3Ω. The power stage as well as all peripheral circuitry (ZCD sensors, sigma-delta modulator, etc.) have been added to the simulation based on the components used in the experimental setup. A transition from late-switching open-loop operation to closed-loop ZCS operation is simulated and verified, as shown in FIG. 15. The zoomed-in view of FIG. 15B indicates that in the case of late-switching the voltage at the switching node, $V_{sw2}$, is clamped as discussed in IV and accurately indicates the polarity of the resonant current at turn-off. The zoomed-in view of FIG. 15C shows that once the closed-loop operation is enabled, ZCS is achieved within several cycles. Average dissipated power of the controller IC has also been extracted from the post-layout simulations and equals 250 μW, with negligible current drawn when the controller is not enabled.

To demonstrate the operation of the controller IC and to further investigate the capabilities of the main control units developed in this study, a full-scale hardware prototype of a 650 W 4:1 STC as well as all required peripherals for the controller operation have been designed, built and tested. The experimental STC hardware has been designed on a 14-layer PCB and it is rated for 650 W. The effective board area of the 4:1 power stage is 5 cm×2 cm. The resonators have been designed symmetrically with equal resonant frequency and the following component values:Cr1=2.35 μF, Lr1=70 nH, Cr2=2.35 μF, Lr2=70 nH.

Figure 16:
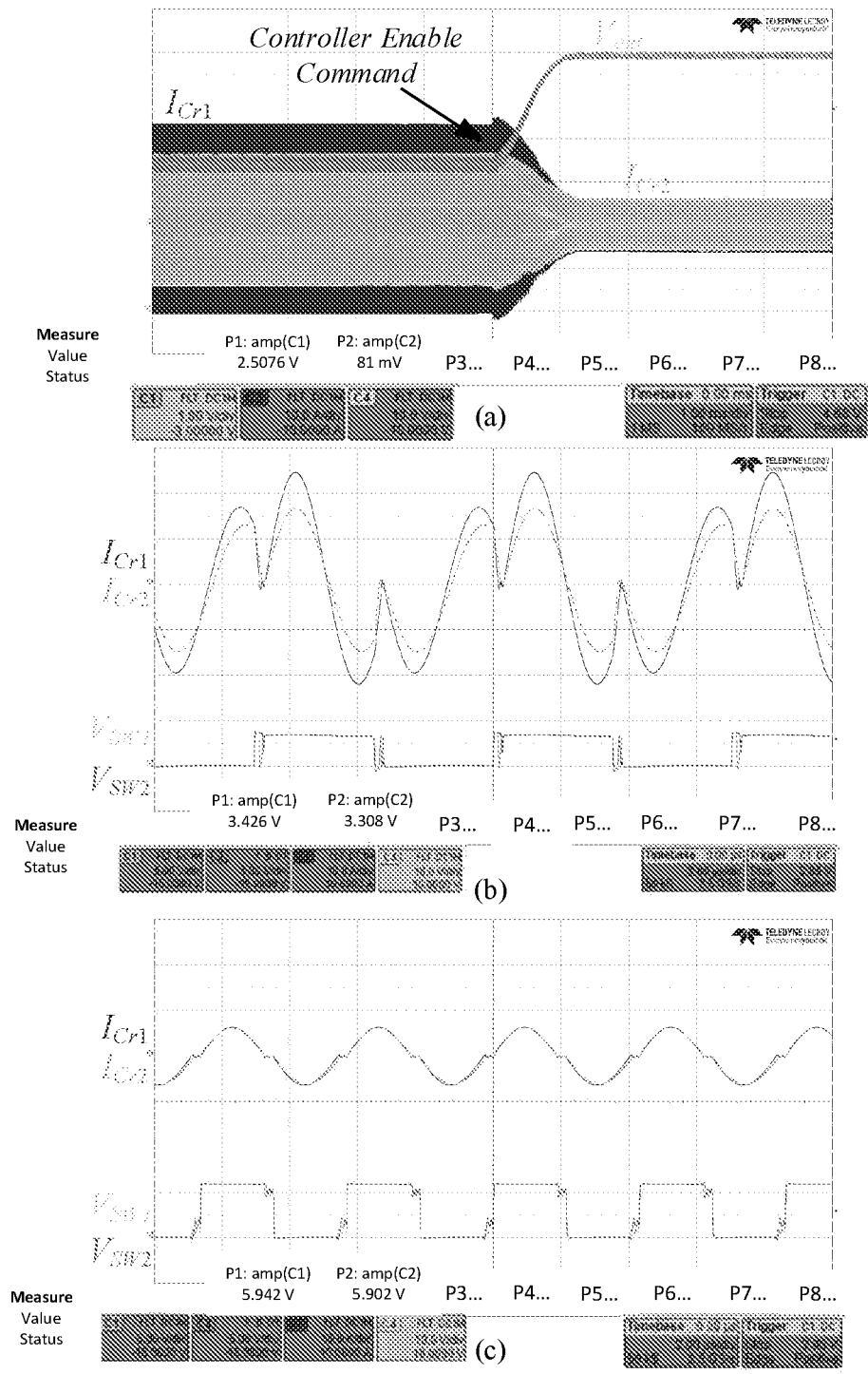
FIG. 16A shows experimental results of a 4:1 STC's transition from open-loop late-switching to ZCS by the digital lock-in controller with a full view of the tanks' currents and the output voltage.
FIG. 16B shows experimental results of a 4:1 STC's transition from open-loop late-switching to ZCS by the digital lock-in controller with zoom-in view during open-loop operation on the tanks' currents (Icr1-blue, Icr2-green) 10A/div, switching nodes (Vsw1-yellow, Vsw2-red) 5V/div, time scale 2 µs/div.
FIG. 16C shows experimental results of a 4:1 STC's transition from open-loop late-switching to ZCS by the digital lock-in controller with zoom-in view during ZCS closed-loop operation on the tanks' currents (Icr1-blue, Icr2-green) 10A/div, switching nodes (Vsw1-yellow, Vsw2-red) 5V/div, time scale 2 µs/div.

FIG. 16 demonstrates the controller's lock-in capabilities for the symmetrical designed 4:1 STC. Here the input voltage of the converter is 24V due to current probe limitations. Once the controller is enabled, the output voltage rises, which is a direct indication for the increased charge transfer rate achieved by reaching ZCS of both resonators. FIGS. 16B-16C are zoom-in on the resonant currents and the switching nodes' voltages during late-switching (FIG. 16B) and ZCS (FIG. 16C). As can be seen, the clamping of the switching nodes' voltages occurs only when the converter does not operate in ZCS. The enable command in this experiment, as well as in all other cases is randomly given to the controller and the switching frequency prior to the enable command is arbitrarily chosen and does not affect the controller's ability to converge to accurate ZCS operation.

Figure 17:
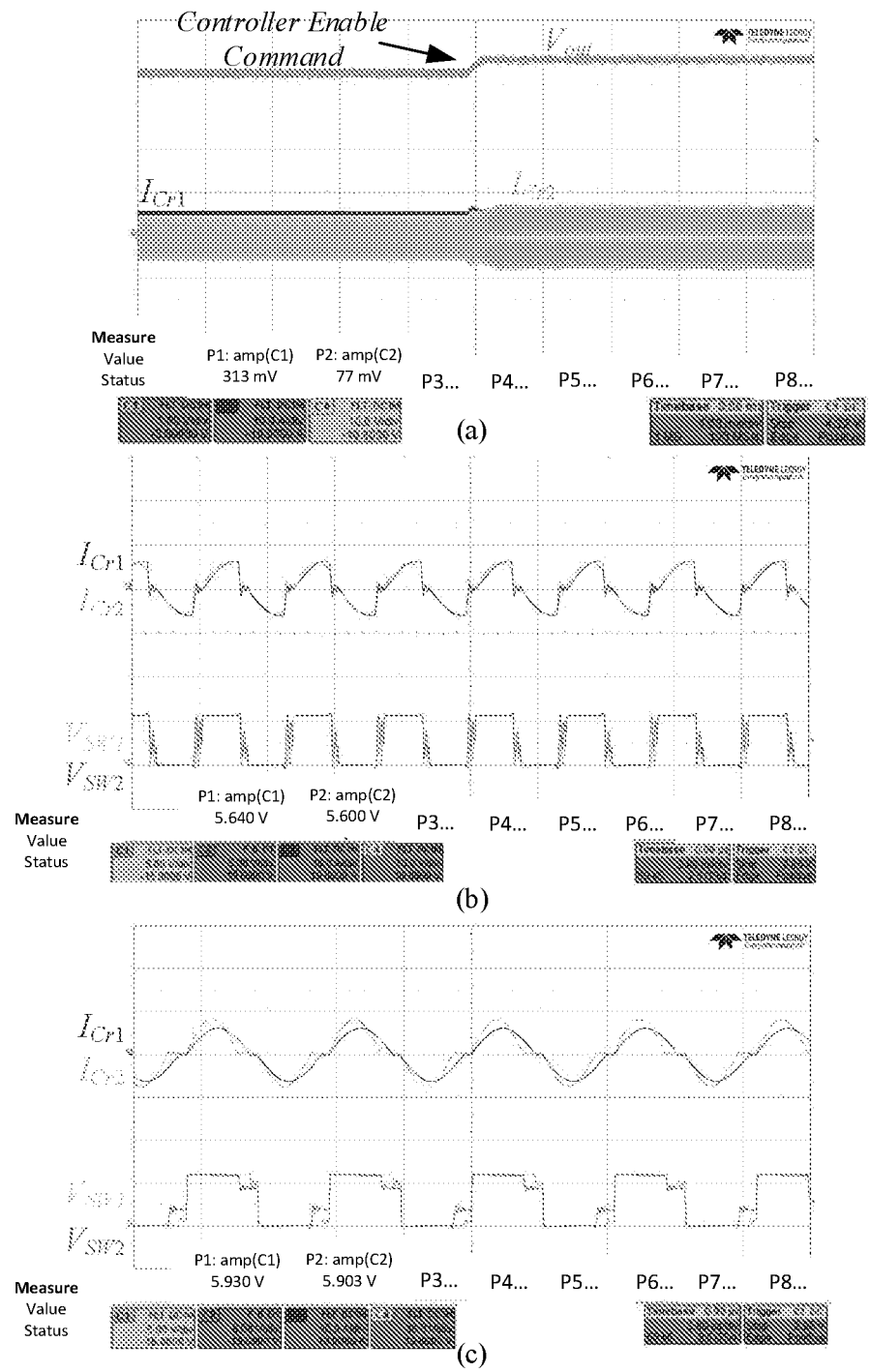
FIG. 17A shows experimental results of a 4:1 STC's transition from open-loop early-switching to ZCS by the digital lock-in controller with a full view of the tanks' currents and the output voltage.
FIG. 17B shows experimental results of a 4:1 STC's transition from open-loop early-switching to ZCS by the digital lock-in controller with zoom-in view during open-loop operation on the tanks' currents (Icr1-blue, Icr2-green) 10A/div, switching nodes (Vsw1-yellow, Vsw2-red) 5V/div, time scale 2 µs/div.
FIG. 17C shows experimental results of a 4:1 STC's transition from open-loop early-switching to ZCS by the digital lock-in controller with zoom-in view during ZCS closed-loop operation on the tanks' currents (Icr1-blue, Icr2-green) 10A/div, switching nodes (Vsw1-yellow, Vsw2-red) 5V/div, time scale 2 µs/div.

FIGS. 17A-17C illustrate experimental waveforms for closed-loop operation of the system with deliberate mismatch between the resonant tanks component values (Cr1=2.62 μF, Lr1=70 nH, Cr2=2.35 μF, Lr2=50 nH). FIG. 17A shows smooth transition from open-loop early-switching operation to ZCS of both resonant tanks. A zoomed-in view of the resonant currents as well as the switching nodes is shown in FIGS. 17B-17C. As can be seen, the on-time for each resonant tank is set individually according to its resonant characteristics. In addition, the clamping of the switching nodes' voltages to Vout+VF is eliminated once ZCS is achieved.

Figure 18:
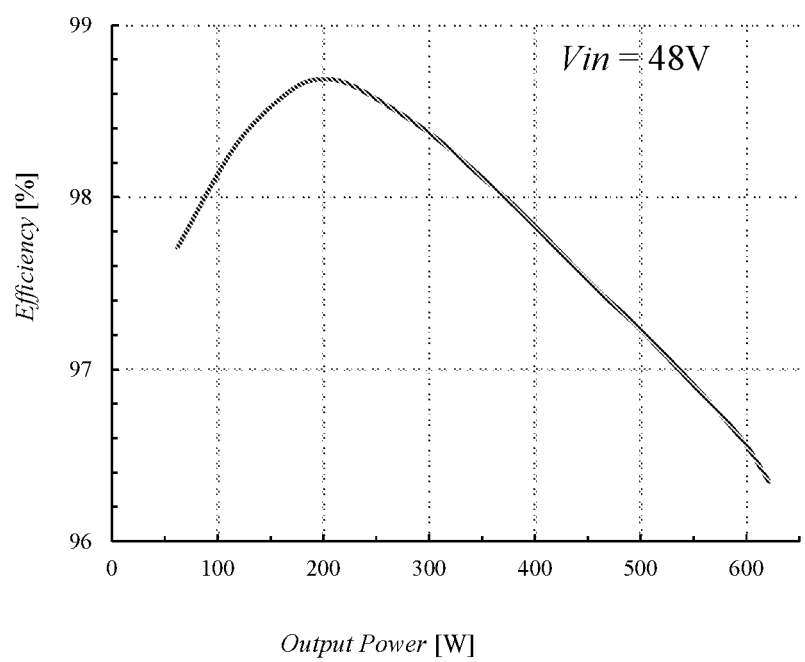
FIG. 18 shows the STC efficiency under tuned conditions.

FIG. 18 shows the efficiency curve as a function of the load under tuned conditions that have been obtained by the controller operation. Here the input voltage of the converter is 48V.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A digital lock-in controller for a resonant-type converter with one or more sub-circuits having resonant tanks and one or more flying capacitors connected across said resonant tanks, comprising:
   a) an auto-tuner that receives as input Zero-Current Detect (ZCD) signals and implements a tuning algorithm by performing arithmetic operations that ensure Zero-Current Switching (ZCS) operation for all resonant tanks in said converter;
   b) a digital High-Resolution (HR) sequencer that receives as input switching-times commands and generates a pulse-width-modulated drive signal that is fed into at least one gate of at least one switching transistor of said converter;
   c) a sampling block with time resolution of a single delay-element, for accurately reading outputs of at least one ZCD sensor including said ZCD signals; and
   d) a governor module for performing synchronization actions and dictating an operation mode of the controller, based on auxiliary configurations,
   wherein Zero-Current Switching (ZCS) operation for all resonant tanks in said converter is performed by:
      initiating a delay estimation procedure for estimating an inherent delay, being the minimum delay between gating signals of said controller and a sampling command that acquires a valid reading from the at least one ZCD sensor, between the gating signals of said controller by sampling the at least one ZCD sensor, once every switching cycle in different locations;
      applying a pre-defined switching frequency is to each resonant tank, until early-switching reading from the at least one ZCD sensor is acquired;
      performing turn-off of power transistors upon start-up and every Nest switching cycles, to thereby consider variations of passive components and clamp the voltage at the switching nodes, when the power transistors are turned-off at the end of a charging phase, wherein a lock-in process to resonance characteristics of each resonant tank comprises:
         a) operating according to user configurable gating-signals without compensation for a pre-determined number of switching-cycles;

b) upon start-up, calculating an inherent delay between the controller and the said converter's transistors;
c) sampling the at least one ZCD sensor to obtain early or late switching-state of each resonant tank;
d) calculating an error signal based on the acquired switching-state of said converter;
e) modifying the duration of the switching cycle for each resonant tank by:
  i) increasing the duration in case early-switching is acquired; or
  ii) decreasing the duration in case late-switching is acquired;
f) calculating the converters switching period based on the results of step e) above;
g) updating the gating-signals for each resonant-tank; and
h) repeating steps c)-f) above, until the controller is disabled,
wherein a sampling operation performed by the sampling block is executed as:
a) a synchronous procedure utilizing a system's internal clock for compensating the inherent delay with the resolution of said internal clock, by performing continuous sampling of the at least one ZCD sensor at the internal clock's frequency from a turn-off command by the controller, until the end of an applied dead-time and processing the samples to acquire the converter's switching-state; or
b) an asynchronous procedure combining the system's internal clock and a delay-line based module for high-resolution sampling with time-resolution of a single delay-element, where, the converter's switching-state is accurately acquired, based on an estimated inherent delay upon start-up, using a single sampling operation,
wherein, once a dead-time period is over, the sampling block provides the auto-tuner with valid readings of the at least one ZCD sensor.

2. The controller according to claim 1, in which the resonant-type converter is a Resonant Switched-Capacitor Converter (RSCC).

3. The controller according to claim 2, in which the auto-tuner is adapted to tune a switching time of each sub-circuit by receiving as input the ZCD signals and outputting the following auxiliary signals:
a) a digital word representing the switching time for each sub-circuit of a Resonant Switched-Capacitor Converter (RSCC), where Most Significant Bits (MSBs) of said digital word corresponds to the coarse part of a drive signal to at least one RSCC transistor with time-resolution of a system's clock switching period and Least Significant Bits (LSBs) of said digital word represents the fine part of said pulse-width-modulated drive signal with time resolution being equal to a delay of a single delay element; and
b) a digital signal indicating a lock-in state of the controller by performing:
  i) inherent delay calculation during start-up;
  ii) a lock-in to the correct switching-time of each sub-circuit;
  iii) in-process of the lock-in to the correct switching-time of one or more sub-circuits.

4. The controller according to claim 1, in which the auto-tuner comprises:
a) a digital compensation unit for evaluating the ZCD signals and determining a required modification of switching times;

b) a digital Low-Pass Filter (LPF) for smoothing noise variations and inaccurate reading of the at least one ZCD sensor; and
c) a digital logic block for producing a digital representation of the lock-in state of the controller while being locked.

5. The controller according to claim 1, in which the digital HR sequencer is adapted to:
a) receive as inputs the switching-times commands for each sub-circuit and a user configurable dead-time;
b) control the dead time for each resonant tank with respect to all other active resonant tanks; and
c) output the pulse-width-modulated drive signal to the at least one RSCC transistor with time resolution of a single delay-element.

6. The controller according to claim 1, in which the sampling operation is executed by the sampling block independently, for each sub-circuit of the RSCC.

7. The controller according to claim 1, in which the Governor module is adapted to:
a) receive as input the auxiliary configuration from a single-pin based Sigma-Delta Analog-To-Digital Converter (SD-ADC) configuration circuit;
b) dictate the desired operation mode of the converter, based on the said auxiliary configuration, by executing:
c) a start-up routine for calculating the inherent delay;
d) a light-load operation, during which sampling and tuning operations are not carried out on a cycle-by-cycle basis to minimize power consumption; and
e) a normal operation mode,
wherein synchronization actions performed by said Governor are based on the system's internal clock and based on information regarding the tuning process provided by the Auto-Tuner block, while being Locked.

8. A method for controlling a resonant-type converter with one or more resonant tanks and one or more flying capacitors connected across said resonant tanks, comprising:
a) performing, by an auto-tuner that receives as input Zero-Current Detect (ZCD) signals, arithmetic operations that ensure Zero-Current Switching (ZCS) operation for all resonant tanks in said converter, to implement a tuning algorithm;
b) generating, by a digital High-Resolution (HR) sequencer that receives as input the switching-times commands, a pulse-width-modulated drive signal that is fed into at least one gate of at least one switching transistor of said converter;
c) accurately reading of the outputs of at least one ZCD sensor by a sampling block with time resolution of a single delay-element; and
d) performing synchronization actions and dictating the operation mode during control operation, based on auxiliary configurations,
wherein Zero-Current Switching (ZCS) operation for all resonant tanks in said converter is performed by:
  initiating a delay estimation procedure for estimating an inherent delay, being the minimum delay between gating signals of said controller and a sampling command that acquires a valid reading from the at least one ZCD sensor, between the gating signals of said controller by sampling the at least one ZCD sensor, once every switching cycle in different locations
  applying a pre-defined switching frequency is to each resonant tank, until early-switching reading from the at least one ZCD sensor is acquired;

performing turn-off of power transistors upon start-up and every Nest switching cycles, to thereby consider variations of passive components and clamp the voltage at the switching nodes, when the power transistors are turned-off at the end of a charging phase, wherein a sampling operation of the sampling block comprises:
a) a synchronous procedure utilizing a system's internal clock by performing continuous sampling of the ZCD sensors at the internal clock's frequency from a turn-off command by the controller, until the end of an applied dead-time and processing the samples to acquire the converter's switching-state; and
b) an asynchronous procedure combining the system's internal clock and a delay-line based module for high-resolution sampling with time-resolution of a single delay-element, where, the converter's switching-state is accurately acquired, based on an estimated inherent delay upon start-up, using a single sampling operation, wherein, once a dead-time period is over, the sampling block provides the auto-tuner with valid readings of the at least one ZCD sensor.

9. The method according to claim 8, wherein the resonant-type converter is a Resonant Switched-Capacitor Converter (RSCC).

10. The method according to claim 8, wherein a lock-in process to resonance characteristics of each resonant tank comprises the steps of:
a) operating according to user configurable gating-signals without compensation for a pre-determined number of switching cycles;
b) calculating an inherent delay between the controller and the said converter's transistors;
c) sampling the at least one ZCD sensor to obtain the switching-state of each resonant tank (early- or late-switching);
d) calculating an error signal based on the acquired switching-state of said converter;
e) modifying the duration of the switching cycle for each resonant tank by:
  i) increasing the duration in case early-switching is acquired; or
  ii) decreasing the duration in case late-switching is acquired;
f) calculating the converters switching period based on the results of step e) above;
g) updating the gating-signals for each resonant-tank; and
h) repeating steps c)-f) above, until the controller is disabled.

11. The method according to claim 8, wherein the digital HR sequencer is adapted to:
a) receive as inputs the switching-times commands for each sub-circuit and a user configurable dead-time; and
b) output the pulse-width-modulated drive signal to at least one RSCC transistor with time resolution of a single delay-element.

12. A digital lock-in controller for a resonant-type converter with one or more sub-circuits having resonant tanks and one or more flying capacitors connected across said resonant tanks, comprising:
a) an auto-tuner that receives as input Zero-Current Detect (ZCD) signals and implements a tuning algorithm by performing arithmetic operations that ensure Zero-Current Switching (ZCS) operation for all resonant tanks in said converter;
b) a digital High-Resolution (HR) sequencer that receives as input switching-times commands and generates a pulse-width-modulated drive signal that is fed into gates of converter's switching transistors at least one gate of at least one switching transistor of said converter;
c) a sampling block with time resolution of a single delay-element, for accurately reading outputs of at least one ZCD sensor including said ZCD signals; and
d) a governor module for performing synchronization actions and dictating an operation mode of the controller, based on auxiliary configurations,
wherein Zero-Current Switching (ZCS) operation for all resonant tanks in said converter is performed by:
initiating a delay estimation procedure for estimating an inherent delay, being the minimum delay between the controller gating signals gating signals of said controller and a sampling command that acquires a valid reading from the at least one ZCD sensor, between the gating signals of said controller by sampling the at least one ZCD sensor, once every switching cycle in different locations;
applying a pre-defined switching frequency is to each resonant tank, until early-switching reading from the at least one ZCD sensor is acquired;
performing actual turn-off of power transistors upon start-up and every Nest switching cycles, to thereby consider variations of passive components and clamp the voltage at the switching nodes, when the power stage transistors are turned-off at the end of a charging phase, wherein a lock-in process to resonance characteristics of each resonant tank comprises:
ae) operating according to user configurable gating-commands signals without compensation for a pre-determined number of switching-cycles;
f) upon start-up, calculating an inherent delay between the controller and the said converter's transistors;
g) sampling the ZCD sensors at least one ZCD sensor to obtain early or late switching-state of each resonant tank;
h) calculating an error signal based on the acquired switching-state of said converter;
i) modifying the duration of the switching cycle for each resonant tank by:
  i1) increasing the duration in case early-switching is acquired; or
  i2) decreasing the duration in case late-switching is acquired;
j) calculating the converters switching period based on the results of step e) above;
k) updating the gating-command signals for each resonant-tank; and
l) repeating steps g)-j) above, until the controller is disabled, wherein a sampling operation performed by the sampling block is executed as:
m) a synchronous procedure utilizing a system's internal clock for compensating the inherent delay with the resolution of said internal clock, by performing continuous sampling of the ZCD sensors at least one ZCD sensor at the internal clock's frequency from a turn-off command by the controller, until the end of an applied dead-time and processing the samples to acquire the converter's switching-state; or
n) an asynchronous procedure combining the system's internal clock and a delay-line based module for high-resolution sampling with time-resolution of a single delay-element, where, the converter's switching-state is accurately acquired, based on an estimated inherent delay upon start-up, using a single sampling operation, wherein, once a dead-time period is over, the sampling block provides the auto-tuner with valid readings of the ZCD sensors at least one ZCD sensor, wherein an inherent delay between the controller's outputs and a RSCC transistors' conduction instance is calculated upon start-up by:
- o) defining default switching frequency according to the nominal values of the passive components of the resonant-tanks, to deliberately ensure early-switching in all sub-circuits;
- p) sampling the ZCD sensors' outputs of the at least one ZCD sensor once every switching-cycle;
- q) evaluating the acquired readings and modifying the sampling location accordingly;
- r) repeating steps p)-q) above until a valid early-switching reading is acquired; and
- s) estimating the inherent delay, based on the sampling-time at the end of the preceding step r).

13. A method for controlling Resonant-type converters a resonant-type converter with one or more resonant tanks and one or more flying capacitors connected across said resonant tanks, comprising:
- a) performing, by an auto-tuner that receives as input Zero-Current Detect (ZCD) signals, arithmetic operations that ensure Zero-Current Switching (ZCS) operation for all resonant tanks in said converter, to implement a tuning algorithm;
- b) generating, by a digital hybrid High-Resolution (HR) sequencer that receives as input the switching-times commands, a pulse-width-modulated drive signal that is fed into the gates at least one gate of the converter's switching transistors at least one switching transistor of said converter;
- c) accurately reading of the ZCD sensor's outputs of at least one ZCD sensor by a sampling block with time resolution of a single delay-element; and
- d) performing synchronization actions and dictating the operation mode during control operation, based on auxiliary configurations, wherein Zero-Current Switching (ZCS) operation for all resonant tanks in said converter is performed by:
initiating a delay estimation procedure for estimating an inherent delay, being the minimum delay between the controller gating signals of said controller and a sampling command that acquires a valid reading from the at least one ZCD sensor, between the gating signals of said controller by sampling the at least one ZCD sensor, once every switching cycle in different locations applying a pre-defined switching frequency is to each resonant tank, until early-switching reading from the at least one ZCD sensor is acquired;

performing actual turn-off of power transistors upon start-up and every Nest switching cycles, to thereby consider variations of passive components and clamp the voltage at the switching nodes, when the power stage transistors are turned-off at the end of a charging phase, wherein the sampling operation if the sampling block is executed as a sampling operation of the sampling block comprises:
- e) a synchronous procedure utilizing a system's internal clock by performing continuous sampling of the ZCD sensors at the internal clock's frequency from a turn-off command by the controller, until the end of an applied dead-time and processing the samples to acquire the converter's switching-state; or
- f) an asynchronous procedure combining the system's internal clock and a delay-line based module for high-resolution sampling with time-resolution of a single delay-element, where, the converter's switching-state is accurately acquired, based on an estimated inherent delay upon start-up, using a single sampling operation, wherein, once a dead-time period is over, the sampling block provides the auto-tuner with valid readings of the ZCD sensors at least one ZCD sensor, wherein an inherent delay between the controller's outputs and a RSCC transistors' conduction instance is calculated upon start-up by:
- g) defining default switching frequency according to the nominal values of the passive components of the resonant-tanks, to deliberately ensure early-switching in all sub-circuits;
- g) sampling the ZCD sensors' outputs of the at least one ZCD sensor once every switching-cycle;
- h) evaluating the acquired readings and modifying the sampling location accordingly;
- i) repeating steps g)-h) above until a valid early-switching reading is acquired; and
- j) estimating the inherent delay, based on the sampling-time at the end of the preceding step i).

* * * * *